United States Patent [19]
Troscinski

[11] Patent Number: 5,353,828
[45] Date of Patent: Oct. 11, 1994

[54] VALVE CONSTRUCTION AND METHOD OF MAKING THE SAME

[75] Inventor: David W. Troscinski, Latrobe, Pa.

[73] Assignee: Robertshaw Controls Company, Richmond, Va.

[21] Appl. No.: 139,535

[22] Filed: Oct. 19, 1993

[51] Int. Cl.⁵ .................. F16K 31/70; F16K 43/00
[52] U.S. Cl. .................. 137/15; 60/528; 60/529; 137/315; 137/870; 137/883; 236/68 R; 251/11
[58] Field of Search .............. 236/68 B, 68 R, 93 R, 236/101 B, 101 E; 251/11; 60/527, 528, 529; 137/1, 625.44, 880, 883, 15, 315

[56] References Cited

U.S. PATENT DOCUMENTS

| | | |
|---|---|---|
| 4,651,968 | 3/1987 | Shopsky ........................ 251/11 |
| 4,681,296 | 7/1987 | Shopsky ........................ 251/11 |
| 4,685,652 | 8/1987 | Shopsky ........................ 251/11 |
| 4,958,801 | 9/1990 | Shopsky ........................ 251/11 |

*Primary Examiner*—George L. Walton
*Attorney, Agent, or Firm*—Candor, Candor & Tassone

[57] ABSTRACT

A valve construction and method of assembling the same are provided, the valve construction having a deflector unit for directing fluid flow from the inlet of the housing means of the valve construction away from an operating part of a bimetallic lever means of the valve construction that controls a valve seat means thereof, the deflector unit having a part engaging one of a top and bottom edge of a screen at the inlet of the housing means so as to hold another part of the deflector unit in a cantilevered manner in the internal chamber of the housing.

20 Claims, 3 Drawing Sheets

VALVE CONSTRUCTION AND METHOD OF MAKING THE SAME

BACKGROUND OF THE INVENTION

1. Field of the Invention

This invention relates to a new valve construction that has a valve member thereof moved in response to the heating and cooling of an operating part of a movable bimetallic lever means and to a new method of assembling such a new valve construction.

2. Prior Art Statement

It is known to provide a valve construction comprising a housing means provided with a chamber therein and with an inlet leading to the chamber and an outlet leading from the chamber, a valve seat carried by the housing means and leading to the outlet, a movable bimetallic lever means carried by the housing means and having an operating bimetallic part and an ambient temperature compensating bimetallic part, a valve member carried by said bimetallic lever means for opening and closing the valve seat under the control of the operating part of the bimetallic lever means, deflector means carried by the housing means for directing the fluid flow from the inlet away from the operating part of the bimetallic lever means when fluid flows through the chamber from the inlet through the outlet, another bimetallic lever means carried by the housing means in spaced apart parallel relation relative to the first mentioned bimetallic lever means, the deflector means having a first part thereof disposed intermediate the bimetallic lever means, and a screen having top and bottom edge means and being carried by the housing means so as to cover the inlet at the chamber thereof. For example, see the U.S. Pat. No. 4,681,296 to Shopsky.

SUMMARY OF THE INVENTION

It is one of the features of this invention to provide a new valve construction which has unique means for holding a deflector means in the chamber of the housing means so that a deflecting part of the deflector means will be held in a cantilevered manner in the chamber between the two spaced apart bimetallic lever means thereof, the cantilevered part deflecting fluid flow from the inlet away from the operating bimetallic part of its adjacent bimetallic lever means.

In particular, it was found according to the teachings of this invention that the deflector means disclosed in the aforementioned U.S. Pat. No. 4,681,296 to Shopsky, for controlling the fluid flow from the inlet of the housing means between the pair of bimetallic lever means is not necessary when it is desired to only deflect the fluid flow away from the operating bimetallic part of only one of the bimetallic lever means.

Accordingly, it was found according to the teachings of this invention that a separate deflector means could be provided for each bimetallic lever means and each deflector means could have unique means for mounting the same against one of the top and bottom edge means of a screen disposed at the inlet of the housing means so as to hold a deflecting part of the deflector means in a cantilevered manner in the internal chamber of the housing means.

For example, one embodiment of this invention comprises a valve construction comprising a housing means provided with a chamber therein and with an inlet leading to the chamber and an outlet leading from the chamber, a valve seat carried by the housing means and leading to the outlet, a movable bimetallic lever means carried by the housing means and having an operating bimetallic part and an ambient temperature compensating bimetallic part, a valve member carried by the bimetallic lever means for opening and closing the valve seat under the control of the operating part of the bimetallic lever means, deflector means carried by the housing means for directing the fluid flow from the inlet away from the operating part of the bimetallic lever means when fluid flows through the chamber from the inlet through the outlet, another bimetallic lever means carried by the housing means in spaced apart parallel relation relative to the first mentioned bimetallic lever means, the deflector means having a first part thereof disposed intermediate the bimetallic lever means, and a screen having top and bottom edge means and being carried by the housing means so as to cover the inlet at the chamber, the deflector means having a second part engaging one of the top and bottom edge means of the screen to hold the first part of the deflector means in a cantilevered manner in the chamber between the bimetallic lever means.

Accordingly, it is an object of this invention to provide a new valve construction having one or more of the novel features of this invention as set forth above or hereinafter shown or described.

Another object of this invention is to provide a new method of assembling such a valve construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
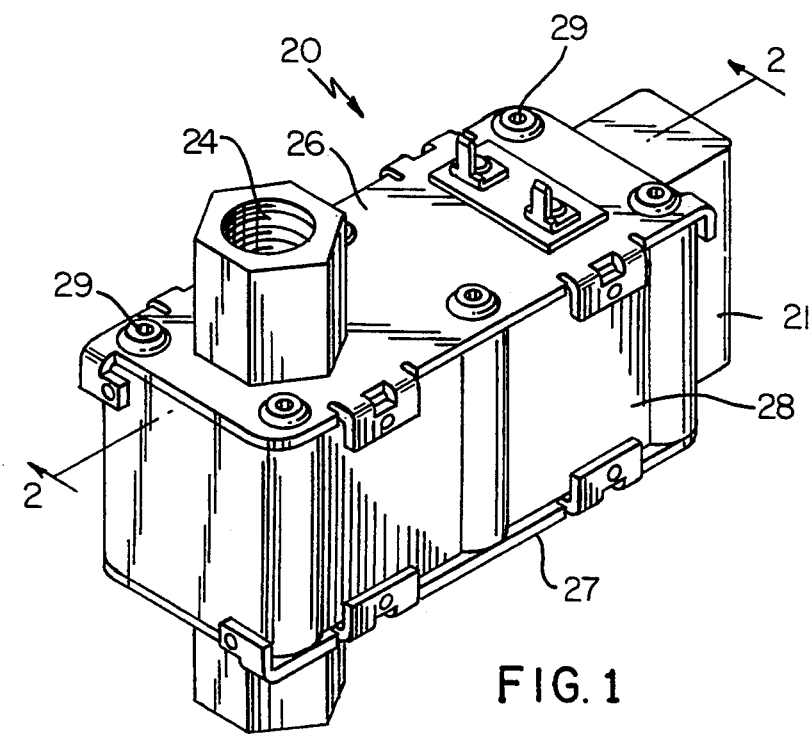
FIG. 1 is a perspective view of the new valve construction of this invention.

While the various features of this invention are hereinafter illustrated and described as being particularly adapted to provide a deflector means for a bimetallic lever means of a particular configuration, it is to be understood that the various features of this invention can be utilized singly or in various combinations thereof to provide valve constructions having bimetallic lever means with other configurations, as desired.

Therefore, this invention is not to be limited to only the embodiments illustrated in the drawings, because the drawings are merely utilized to illustrate one of the wide variety of uses of this invention.

Referring now to FIGS. 1–4, a new valve construction of this invention is generally indicated by the reference numeral 20 and comprises a housing means 21 having a chamber 22 therein with an inlet means 23 leading to the chamber 22 and a pair of outlet means 24 and 25 leading from the chamber 22 and being respectively carried by cover members 26 and 27 that form part of the housing means 21 when the same are fastened to a body member 28 by fastening means 29 as illustrated in the drawings.

The outlet means 24 and 25 each has a valve seat means 30 that is respectively controlled by a valve member 31 carried by a bimetallic lever means 32 that has one end 33 thereof fastened to a retainer means 34 that, in turn, is fastened to its respective cover means 26 or 27 as illustrated.

Each bimetallic lever means 32 comprises an operating bimetallic part 35 and an ambient temperature compensating bimetallic part 36 interconnected together in overlapping relation, such as by spot welding, with the valve member 31 being carried on a free end 37 of the ambient temperature compensating part 36 to control its respective valve seat 30. Each bimetallic valve member 32 has a heater wire 38 disposed on the operating bimetallic part 35 thereof which will cause the respective bimetallic member 32 to warp away from the valve seat 30 when an electrical current flows through the heater wire 38 and will permit the bimetallic lever means 32 to return to its valve closing condition when the bimetallic operating part 35 is permitted to cool when the current flow through the wire means 38 ceases all in a manner fully disclosed in the aforementioned U.S. Pat. No. 4,681,296 to Shopsky whereby this U.S. patent is being incorporated into this disclosure by this reference thereto.

While the heater wire means 38 for each bimetallic lever means 32 can be disposed on the operating part 35 in any suitable manner, it is presently preferred to assemble the wire means 38 in the manner illustrated and fully disclosed in the U.S. Pat. No. 4,958,801 to Shopsky whereby this U.S. patent is also being incorporated into this disclosure by this reference thereto.

Therefore, it can be seen that in general, the details of the structure and the details of the operation of the valve construction 20 of this invention are well known in the art and need not be further described. However, sufficient details thereof will be hereinafter set forth in order to fully understand the features of this invention.

As fully described in the aforementioned patent to Shopsky, U.S. Pat. No. 4,681,296, it was found that when one of the bimetallic lever means 32 is warped by having an electrical current pass through the heater wire means 38 thereof so as to open its respective valve member 31 away from its respective valve seat 30, the flow of fuel from a fuel source (not shown) into the chamber 22 from the inlet 23 so as to pass out through the now opened valve seat 30 to a burner means (not shown) interconnected to the outlet 24 or 25 would tend to impinge on the operating part 35 of that bimetallic lever means 32 and this gas flow naturally has a cooling effect upon the operating part 35 thereby reducing the effective heating of the bimetallic part 35 and thus the deflection of the bimetallic lever means 32 in its intended direction to continue opening the valve member 31 away from its respective valve seat 30 whereby it was determined that if some means is provided to isolate the operating part 35 of the bimetallic lever means 32 from such gas flow upon valve opening, this would reduce the tendency of the bimetallic element to cool.

The prior known means of the aforementioned U.S. Pat. No. 4,681,296 to Shopsky for so preventing such fluid flow is provided by a deflector plate means disposed in the chamber 22 and having an opening passing therethrough so that the flow of fuel from the inlet 23 through that opening is deflected by tongues of the deflector plate means away from the operating parts of the two bimetallic lever means 32.

Figure 6:
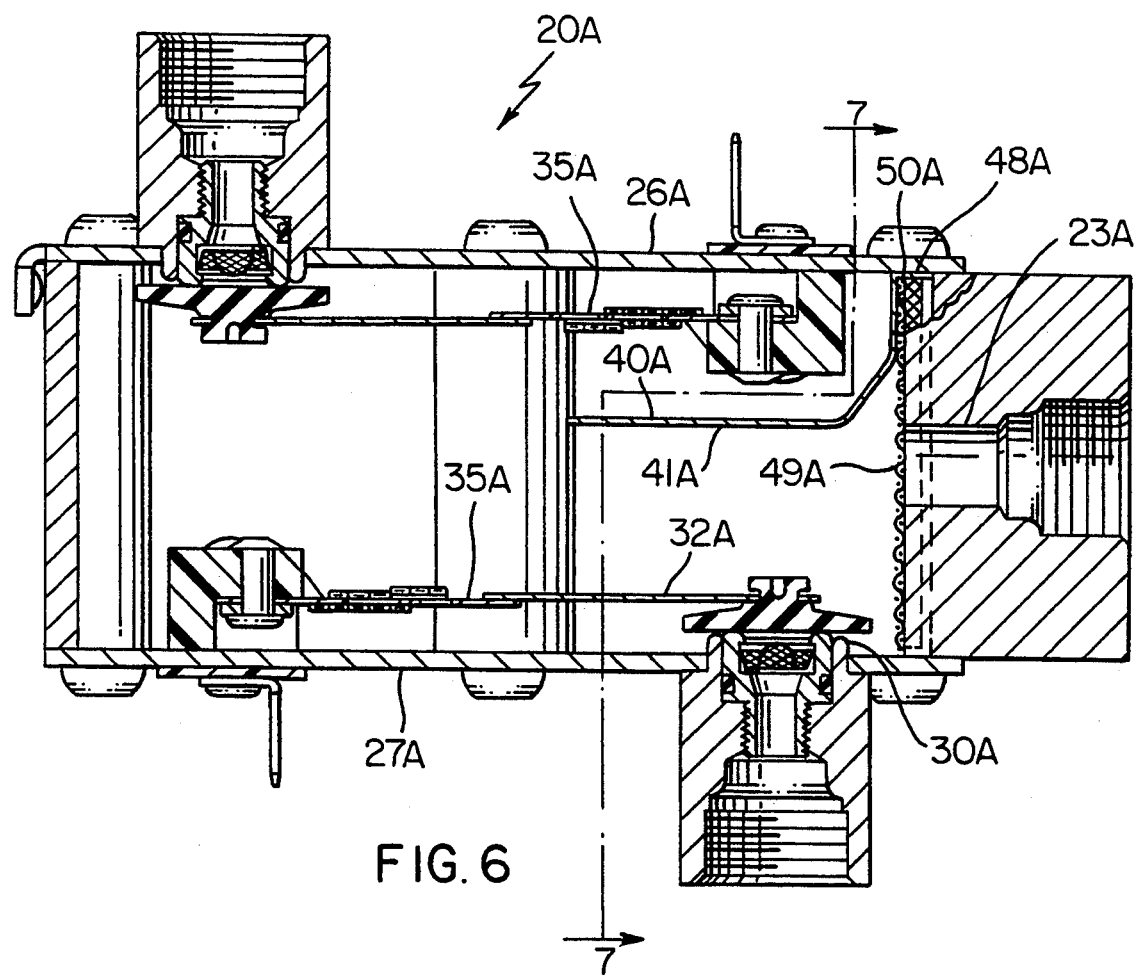
FIG. 6 is a view similar to FIG. 2 and illustrates another valve construction of this invention.
Figure 7:
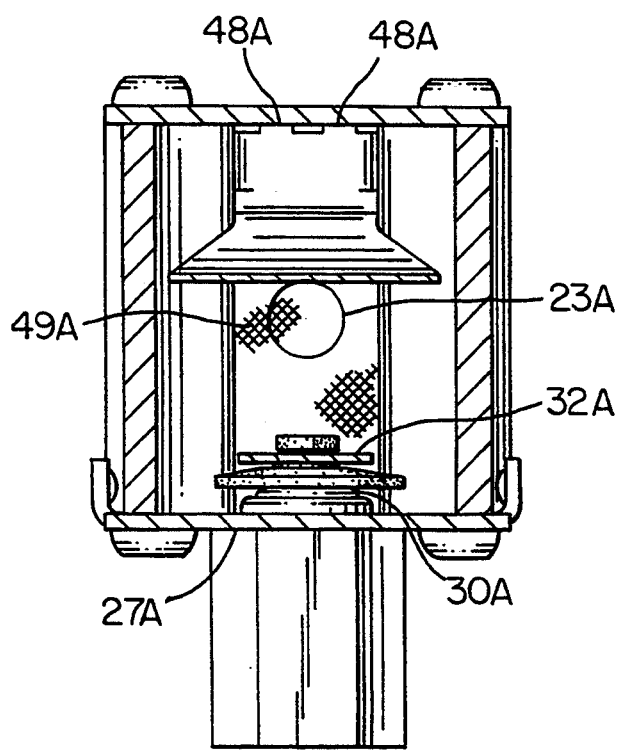
FIG. 7 is a cross-sectional view taken on line 7—7 of FIG. 6.

However, it was found according to the teachings of this invention that there are times when only a deflector means is needed for one of the bimetallic lever means because the other bimetallic lever means is disposed with its operating bimetallic part remote from the inlet means as illustrated by the bimetallic lever means 32A′ in FIGS. 6 and 7 so that a deflector means is only needed for the other bimetallic lever means 32A illustrated in FIGS. 6 and 7.

However, since both bimetallic lever means 32 in the valve construction 20 of FIGS. 1–4 have the operating parts 35 thereof disposed closely adjacent the inlet 23, two like deflector means 40 of this invention are utilized in the valve construction 20 of this invention.

Figure 5:
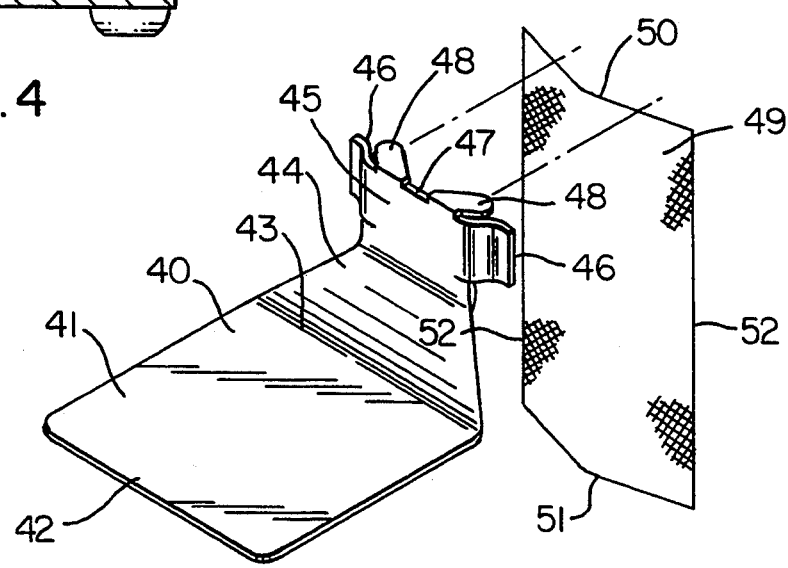
FIG. 5 is an exploded perspective view of one of the deflector means and the inlet screen for the valve construction of FIGS. 1-4.

As illustrated in FIG. 5, each deflector means 40 of this invention has a first part 41 thereof that is substantially rectangular and flat so as to have a free end 42 and an inner end 43 interconnected to a bent part 44 that interconnects with a flat section 45 that is disposed substantially perpendicular to the first part 41 and has a pair of side edge ears 46 and a top edge means 47 as illustrated, the top edge means 47 having a pair of tabs 48 bent at a right angle relative to the part 45 for a purpose hereinafter set forth.

While the deflector means 40 of this invention can be formed of any suitable material, the same can be formed of metallic material.

Figure 2:
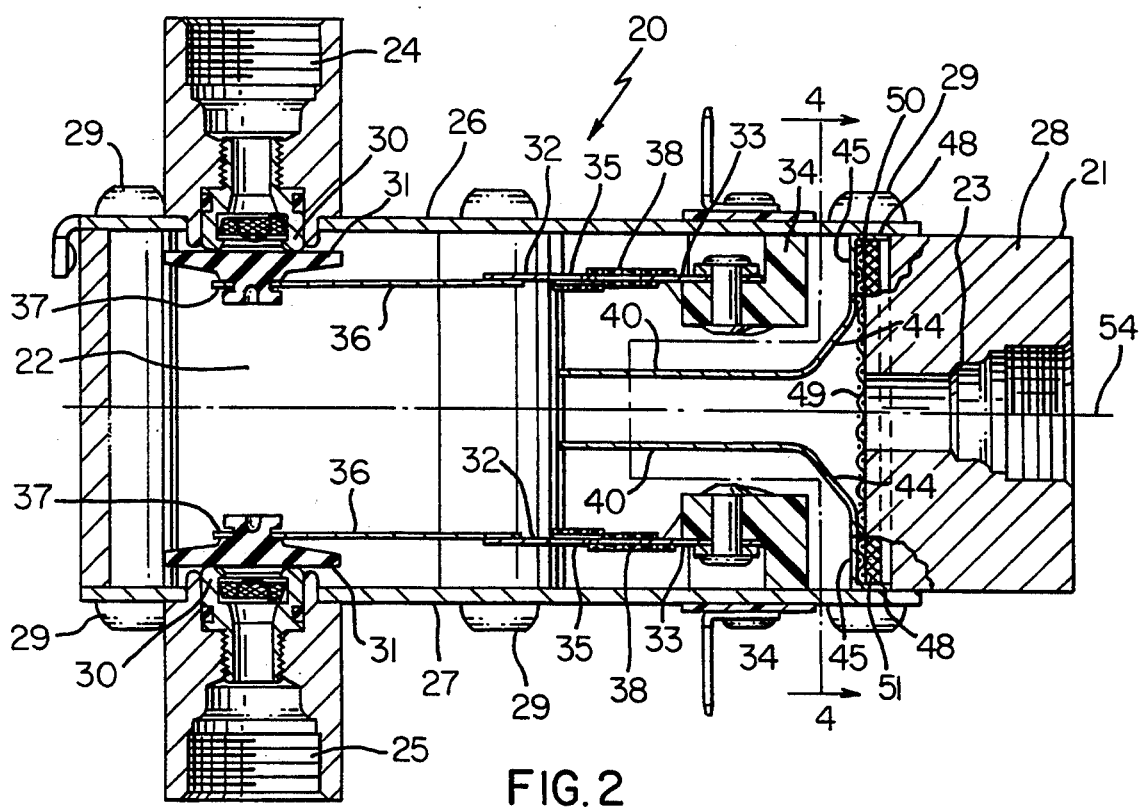
FIG. 2 is an enlarged cross-sectional view taken on line 2—2 of FIG. 1.
Figure 3:
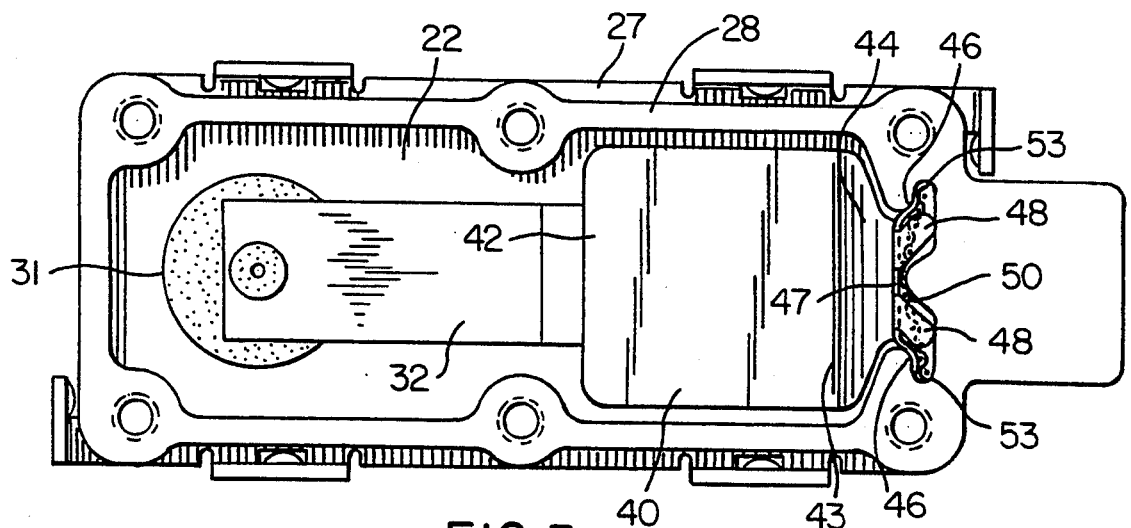
FIG. 3 is a top view of the valve construction of FIG. 2 with the cover member and its associated parts removed.
Figure 4:
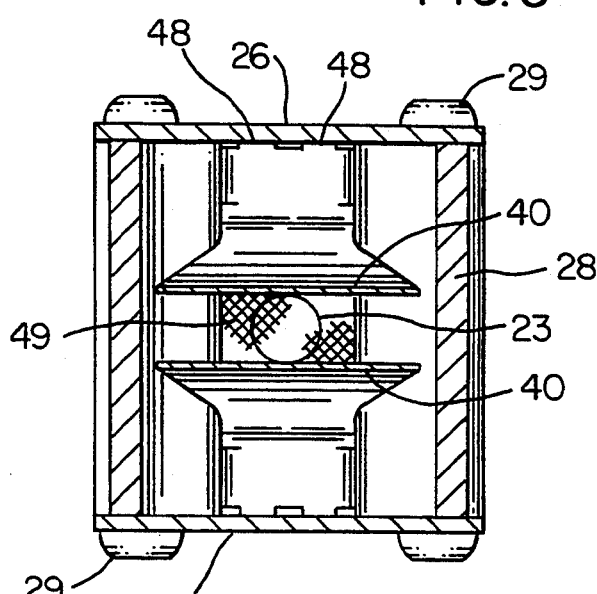
FIG. 4 is a cross-sectional view taken on line 4—4 of FIG. 2.

A screen member 49 that is substantially rectangular in configuration so as to have a top edge 50 and an opposite bottom edge 51 as well as opposed side edge means 52 is disposed in the housing means 21 so that the side edge means 52 are received in side slot means 53 of the housing member 28 that extend between the cover members 26 and 27 as illustrated in FIGS. 2 and 3 whereby the top edge 50 of the screen 49 is disposed adjacent the cover 26 and the bottom edge 51 is disposed against the bottom cover 27 all in the manner fully set forth in the aforementioned U.S. Pat. No. 4,681,296 to Shopsky so that a medial portion of the screen 49 completely covers the inlet 23 at the chamber 22 of the housing means 21 for a filtering purpose.

The deflector means 40 for the upper bimetallic lever means 32 has the side ears 46 thereof likewise pushed into the slots 53 of the housing member 28 while the tab means 48 thereof are forced between the top edge 50 of the screen 49 and the top cover member 26 so that the tabs 48 engage the top edge means 50 of the screen 49 and thereby hold the flat part 41 of that deflector 40 in a cantilevered manner in the chamber 22 as illustrated in FIG. 2 wherein the flat part 41 is disposed substantially parallel with the operating part 35 of the upper bimetallic lever means 32 and is spaced above a longitudinal axis 54 of the housing means 21 that passes centrally through the inlet means 23 as illustrated.

The lower deflector means 40 likewise has its side ears 46 pushed into the slot means 53 of the housing member 28 while the tab means 48 thereof are forced between the bottom edge means 51 of the screen 49 and the bottom cover member 27 as illustrated in the drawings whereby its flat part 41 is also disposed parallel to the operating part 38 of the bottom bimetallic lever means 32 and is parallel to the part 41 of the upper deflector 40 in spaced relation therefrom and spaced below the axis 54 of the housing means 21 as illustrated.

Thus, in any rotational position of the valve construction 20, the tabs 48 of the deflector means 40 maintain the deflector means 40 with their parts 41 arranged in a cantilevered manner in the chamber 22 so that the particular deflector means 40 which is disposed at the top of the housing means 21 will not slip downwardly by gravity in view of its tab means 48 engaging the particular edge means 50 or 51 which is disposed in an up condition at that time.

Thus, it can be seen that as the fluid flows through the inlet means 23 to one or both opened valve seats 30, the deflector means 40 prevent the flow of fuel from impinging against the operating parts 35 of the respective bimetallic lever means 32 to prevent cooling thereof as previously set forth.

Also, as previously set forth, it can be seen in FIGS. 6 and 7 that another valve construction 20A of this invention has the parts thereof that are similar to the parts of the valve construction 20 previously set forth designated by like reference numerals followed by the reference letter "A".

As illustrated in FIGS. 6 and 7, the lower bimetallic lever means 32A' has the housing cover means 27A thereof reversed from the cover means 27 so that the valve seat means 30A thereof is disposed closely adjacent the inlet 23A whereby the operating part 35A of the bimetallic lever means 32A' is disposed remote from the inlet 23A and, therefore, does not need a deflector means 40A therefor in the same manner that the upper bimetallic lever means 32A needs the deflector 40A for the reasons previously set forth in regard to the valve construction 20 previously described.

However, it can be seen that since the deflector means 40A of the valve construction 20A has the tab means 48A thereof disposed against the top edge means 50A of the screen member 49 so as to be held between the top edge means 50A and the top cover member 26A, the part 41A of the deflector means 40A will be disposed in the cantilevered manner illustrated in FIG. 6 to deflect any flow of cooling fuel from the inlet 23A away from the operating part 35A of the upper bimetallic lever means 32A for the reasons previously set forth.

Therefore, it can be seen that this invention provides a new valve construction and a new method of making such a valve construction.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a valve construction comprising a housing means provided with a chamber therein and with an inlet leading to said chamber and an outlet leading from said chamber, a valve seat carried by said housing means and leading to said outlet, a movable bimetallic lever means carried by said housing means and having an operating bimetallic part and an ambient temperature compensating bimetallic part, a valve member carried by said bimetallic lever means for opening and closing said valve seat under the control of said operating part of said bimetallic lever means, deflector means carried by said housing means for directing said fluid flow from said inlet away from said operating part of said bimetallic lever means when fluid flows through said chamber from said inlet through said outlet, another bimetallic lever means carried by said housing means in spaced apart parallel relation relative to the first mentioned bimetallic lever means, said deflector means having a first part thereof disposed intermediate said bimetallic lever means, and a screen having top and bottom edge means and being carried by said housing means so as to cover said inlet at said chamber, the improvement wherein said deflector means has a second part engaging one of said top and bottom edge means of said screen to hold said first part of said deflector means in a cantilevered manner in said chamber between said bimetallic lever means, said second part of said deflector means extending over said one of said top and bottom edge means of said screen and engaging a portion of the interior of said housing means adjacent said inlet for suspending said deflector means solely between said one of said top and bottom edge means of said screen when that one of said top and bottom edge means of said screen is above the other of said top and bottom edge means of said screen and the portion of the Anterior of said housing means adjacent said one of said rod and bottom edge means of said screen.

2. A valve construction as set forth in claim 1 wherein said second part of said deflector means comprises tab means extending between said one of said top and bottom edge means of said screen and said housing means.

3. A valve construction as set forth in claim 2 wherein said tab means is sandwiched between said housing means and said one of said top and bottom edge means of said screen.

4. A valve construction as set forth in claim 1 wherein said housing means has a longitudinal central axis that passes substantially centrally through said inlet, said first part of said deflector means being substantially flat and being disposed parallel to said axis in spaced relation therefrom.

5. A valve construction as set forth in claim 4 wherein said first part of said deflector means is disposed intermediate said operating bimetallic part of its adjacent bimetallic lever means and said axis.

6. A valve construction as set forth in claim 1 and comprising a second deflector means having said second part thereof engaging the other of said top and bottom edge means of said screen to hold said first part thereof of said second deflector means in a cantilevered manner in said chamber between said bimetallic lever means.

7. A valve construction as set forth in claim 6 wherein each said second part of its respective deflector means comprises tab means extending between its respective edge means of said screen and said housing means.

8. A valve construction as set forth in claim 7 wherein each said tab means is sandwiched between said housing means and its respective edge means of said screen.

9. A valve construction as set forth in claim 6 wherein said housing means has a longitudinal central axis that passes substantially centrally through said inlet, said first part of each said deflector means being substantially flat and being disposed parallel to said axis in spaced relation therefrom.

10. A valve construction as set forth in claim 9 wherein each said first part of its respective deflector means is disposed intermediate said operating bimetallic part of its adjacent bimetallic lever means and said axis.

11. In a method of assembling a valve construction comprising a housing means provided with a chamber therein and with an inlet leading to said chamber and an outlet leading from said chamber, a valve seat carried by said housing means and leading to said outlet, a movable bimetallic lever means carried by said housing means and having an operating bimetallic part and an ambient temperature compensating bimetallic part, a valve member carried by said bimetallic lever means for opening and closing said valve seat under the control of said operating part of said bimetallic lever means, deflector means carried by said housing means for directing said fluid flow from said inlet away from said operating part of said bimetallic lever means when fluid flows through said chamber from said inlet through said outlet, another bimetallic lever means carried by said housing means in spaced apart parallel relation relative to the first mentioned bimetallic lever means, said deflector means having a first part thereof disposed intermediate said bimetallic lever means, and a screen having top and bottom edge means and being carried by said housing means so as to cover said inlet at said chamber, the improvement comprising the steps of providing said deflector means to have a second part engaging one of said top and bottom edge means of said screen to hold said first part of said deflector means in a cantilevered manner in said chamber between said bimetallic lever means, and providing said second part of said deflector means to extend over said one of said top and bottom edge means of said screen and to engage a portion of the interior of said housing means adjacent said inlet for suspending said deflector means solely between said one of said top and bottom edge means of said screen when that one of said top and bottom edge means of said screen is above the other of said top and bottom edge means of said screen and the portion of the interior of said housing means adjacent said one of said top and bottom edge means of said screen.

12. A method as set forth in claim 11 and comprising the step of providing said second part of said deflector means to comprise tab means extending between said one of said top and bottom edge means of said screen and said housing means.

13. A method as set forth in claim 12 and comprising the step of sandwiching said tab means between said housing means and said one of said top and bottom edge means of said screen.

14. A method as set forth in claim 11 and comprising the step of providing said housing means to have a longitudinal central axis that passes substantially centrally through said inlet, providing said first part of said deflector means to be substantially flat, and inserting said first part parallel to said axis in spaced relation therefrom.

15. A method as set forth in claim 14 and comprising the step of inserting said first part of said deflector means intermediate said operating bimetallic part of its adjacent bimetallic lever means and said axis.

16. A method as set forth in claim 11 and comprising the step of providing a second deflector means to have said second part thereof engaging the other of said top and bottom edge means of said screen to hold said first part thereof of said second deflector means in a cantilevered manner in said chamber between said bimetallic lever means.

17. A method as set forth in claim 16 and comprising the step of providing each said second part of its respective deflector means to comprise tab means extending between its respective edge means of said screen and said housing means.

18. A method as set forth in claim 17 and comprising the step of sandwiching each said tab means between said housing means and its respective edge means of said screen.

19. A method as set forth in claim 16 and comprising the step of providing said housing means to have a longitudinal central axis that passes substantially centrally through said inlet, providing said first part of each said deflector means to be substantially flat, and inserting each said first part parallel to said axis in spaced relation therefrom.

20. A method as set forth in claim 19 and comprising the step of inserting each said first part of its respective deflector means intermediate said operating bimetallic part of its adjacent bimetallic lever means and said axis.

* * * * *